(12) United States Patent
Li et al.

(10) Patent No.: US 11,825,233 B2
(45) Date of Patent: Nov. 21, 2023

(54) DATA TRANSMISSION SYSTEM AND DATA TRANSMISSION METHOD

(71) Applicant: Chengdu Accsoon Technology Co., Ltd., Sichuan (CN)

(72) Inventors: Jie Li, Sichuan (CN); Jie Zhang, Sichuan (CN)

(73) Assignee: Chengdu Accsoon Technology Co., Ltd., Chengdu (CN)

( * ) Notice: Subject to any disclaimer, the term of this patent is extended or adjusted under 35 U.S.C. 154(b) by 64 days.

(21) Appl. No.: 17/518,577

(22) Filed: Nov. 3, 2021

(65) Prior Publication Data
US 2022/0159210 A1 May 19, 2022

(30) Foreign Application Priority Data
Nov. 18, 2020 (CN) .......................... 202011297619.5

(51) Int. Cl.
| | |
|---|---|
| H04N 5/38 | (2006.01) |
| H04N 19/164 | (2014.01) |
| H04N 19/169 | (2014.01) |
| H04N 19/44 | (2014.01) |
| H04N 19/89 | (2014.01) |
| H04N 7/20 | (2006.01) |

(52) U.S. Cl.
CPC ................ *H04N 5/38* (2013.01); *H04N 7/20* (2013.01); *H04N 19/164* (2014.11); *H04N 19/188* (2014.11); *H04N 19/44* (2014.11); *H04N 19/89* (2014.11)

(58) Field of Classification Search
CPC .... H04N 19/164; H04N 19/188; H04N 19/39; H04N 19/44; H04N 19/89; H04N 21/43637; H04N 5/38; H04N 7/20; H04N 21/238
See application file for complete search history.

(56) References Cited

U.S. PATENT DOCUMENTS

| | | | | |
|---|---|---|---|---|
| 9,692,559 | B1 * | 6/2017 | Zhang | H04L 5/0023 |
| 2007/0245205 | A1 * | 10/2007 | Popovski | H04L 1/0668 |
| | | | | 714/749 |
| 2011/0182195 | A1 * | 7/2011 | Oikawa | H04L 1/0034 |
| | | | | 370/252 |
| 2016/0105261 | A1 * | 4/2016 | Suh | H04L 1/0643 |
| | | | | 370/338 |
| 2017/0055159 | A1 * | 2/2017 | Boppana | H04W 72/0453 |

(Continued)

*Primary Examiner* — Mohammed S Rahaman

(57) ABSTRACT

Disclosed is a data transmission system having a transmitter and a receiver. The transmitter encodes external input signals to acquire coded transmission data transmitted in multiple paths with different frequency band, and then transmits them to respective receiver; and the receiver performs data fusion on the received transmission signals to acquire coded received data, and decodes it to acquire and output the decoded data. In conclusion, since the received signals are split into a plurality of transmission signals of different frequency bands by the transmitter and the signals are fused in the receiver, the signals are not susceptible to the same frequency interference during transmission, improving the anti-interference of the data transmission system, realizing high-reliability transmission at low cost or in a complex wireless environment, also expanding the applications of the data transmission system.

20 Claims, 8 Drawing Sheets

(56) References Cited

U.S. PATENT DOCUMENTS

| | | | |
|---|---|---|---|
| 2018/0063214 A1* | 3/2018 | Ko | H04N 21/4622 |
| 2020/0146060 A1* | 5/2020 | Jung | H04W 4/40 |
| 2022/0109477 A1* | 4/2022 | Krishnamachari | H01Q 21/24 |

* cited by examiner

DATA TRANSMISSION SYSTEM AND DATA TRANSMISSION METHOD

REFERENCE TO RELATED APPLICATION

This application claims priority to China patent Application No. 202011297619.5 filed on Nov. 18, 2020, the content of which is hereby incorporated by reference.

TECHNICAL FIELD

The present disclosure relates to data communication, in particular to data transmission systems and data transmission methods.

BACKGROUND OF THE INVENTION

A data transmission system, a communication system that transmits data from one place to another, can transmit various types of data. For example, a data transmission system can be a device that remotely transmits multimedia data acquired by cameras, webcams, video playback devices, etc., in a wireless manner, and is widely used in security, film and television industries.

There may be three types of known wireless transmission methods for data, including: type I: setting the transmission frequency band of the data transmission system to be fixed; type II: automatically switching frequency bands when encountering interference; and type III: using frequency hopping technology.

With type I, other wireless signals in the same frequency band may cause pictures to be transmitted to freeze, blur or mosaic during the transmission, leading to poor experience and restriction of applications.

With type II, the issue of same frequency interference may be avoided, that is, the data transmission system may detect the surrounding wireless environment during operating, and then switch to other frequency bands to run when it is interfered at the frequency band it uses. The systems adopting such type II may be better than those with type I in stability, but there may be problems such as temporary freeze of pictures or black screen during switching frequency bands.

With type III, the transmission frequency band adopted by the data transmission system is constantly changed during operating. Such type III is good at stability, but it is difficult to develop and costly.

SUMMARY OF THE INVENTION

In view of the above, data transmission systems and methods that can improve anti-interference performance are provided in the present disclosure.

According to a first aspect, a data transmission system provided in an embodiment may include a transmitter and a receiver, the transmitter may have a data input unit including a video input unit and a data encoding unit including a video encoding unit coupled to the video input unit;

the video input unit may be configured to convert inputted video data;

the video encoding unit may be coupled to an output of the video input unit and configured to convert the video data from the video input unit into a plurality of frames of image data and convert each frame of image data into N data packets, where N is a positive integer;

the video encoding unit may have an output coupled to a first transmitting unit and a second transmitting unit respectively and may be configured to transmit data packets of the same frame from the plurality of frames to a first transmitting unit and a second transmitting unit respectively, the first transmitting unit may be configured to send the N data packets of the frame in a predetermined first frequency band, and the second transmitting unit may be configured to send the N data packets of the frame in a predetermined second frequency band, where the first frequency band is different from the second frequency band;

the receiver may comprise a first receiving unit wirelessly coupled to the first transmitting unit, a second receiving unit wirelessly coupled to the second transmitting unit, a data decoding unit including a video decoding unit, and a data output unit;

the first receiving unit may be configured to receive the N data packets of the frame sent by the first transmitting unit, and the second receiving unit may be configured to receive the N data packets of the frame sent by the second transmitting unit;

the data output unit may include a video output unit coupled to the video decoding unit coupled to the first receiving unit and the second receiving unit;

the video decoding unit may be configured to perform data fusion on acquired the N data packets received by the first receiving unit and the N data packets received by the second receiving unit into one complete frame of image data, and concatenate the plurality of frames of data recovered sequentially into complete video data; and the data output unit may be configured to receive and output the video data output by the video decoding unit.

According to a second aspect, a data transmission method for a data transmission system is provided in an embodiment, wherein the data transmission system comprises a transmitter and a receiver, the transmitter has a video encoding unit, a first transmitting unit and a second transmitting unit, and the receiver has a video decoding unit, a first receiving unit and a second receiving unit;

the data transmission method may comprise the following steps:

step 1: splitting video data from the video input unit into a plurality of frames of image data by the video encoding unit;

step 2: splitting each individual frame of image data into N data packets and numbering each data packet by the video encoding unit;

step 3: for each individual frame, transmitting the N data packets of the same frame from the plurality of frames to the first transmitting unit and the second transmitting unit by the video encoding unit respectively, wherein the first transmitting unit transmits the N data packets of the frame to the first receiving unit with a first frequency band, the second transmitting unit transmits the same N packets to the second receiving unit with a second frequency band different from the first frequency band, and the frequency band used between the first transmitting unit and the first receiving unit is different from the frequency band used between the second transmitting unit and the second receiving unit;

step 4: transferring the N data packets to the video decoding unit by first and second receiving units after they receive the N data packets respectively;

step 5: checking whether each data packet of the frame from the one of the first and second receiving units is correct by the video decoding unit, when a data packet of a certain number is incorrect, then checking whether the same numbered data packet of the frame from the other of the first and second receiving units is correct, when it is correct, proceeding to a next step, and when it is incorrect, requesting the first transmitting unit and the second transmitting unit to resend the same numbered data packet;

step 6: assembling all correct N data packets of the frame into one frame of image data, and hereby sequentially recovering the plurality of frames of image data by the video decoding unit; and step 7: concatenating the plurality of frames of image data into a complete video data and outputting it to the video output unit by the video decoding unit.

According to a third aspect, a data transmission system provided in an embodiment may comprise a transmitter and a receiver;

wherein the transmitter may comprise:

a data input unit, configured to receive an external input signal and convert it into data in a preset data format;

a data encoding unit coupled to an output of the data input unit, configured to encode the input data to acquire coded transmission data which is then split into a plurality of data packets; and a wireless transmitting unit, configured to convert the same coded transmission data into transmission signals with different frequency bands transmitted in multiple paths, and transmit them to respective receivers;

and the receiver may comprise:

a wireless receiving unit, configured to receive the transmission signals transmitted in multiple paths from the wireless transmitting unit;

a data decoding unit coupled to the wireless receiving unit, configured to perform data fusion on the transmission signals transmitted in multiple paths and received by the wireless receiving unit to acquire coded received data and decode it to acquire decoded data; and a data output unit, configured to output the decoded data.

With the data transmission system provided in the present disclosure, a transmitter and a receiver are included, wherein the transmitter encodes the external input signal to acquire coded transmission data, and then transmits the same coded transmission data to the corresponding receiver through multiple transmission units in different frequency bands; and the receiver performs data fusion on the received transmission signals to acquire coded received data, and decodes the coded received data to acquire and output the decoded data. In conclusion, since the received external input signals are split into a plurality of transmission signals of different frequency bands by the transmitter and are transmitted to the receiver, the signals are not susceptible to the same frequency interference in the surrounding system environment during transmission, improving the anti-interference of the data transmission system, realizing high-reliability transmission at low cost or in a complex wireless environment, also expanding the applications of the data transmission system.

DETAILED DESCRIPTION

The following describes the specific embodiments of the present disclosure to facilitate those skilled in the art to understand the present disclosure; however, it should be appreciated that the present disclosure is not limited to the scope of the specific embodiments, and for those of ordinary skill in the art, as long as various changes and modifications within the spirit and scope of the present disclosure defined and determined by the appended claims, such changes and modifications are obvious. All inventions and creations based on the concept of the present disclosure fall within the scope of the claims.

Figure 1:
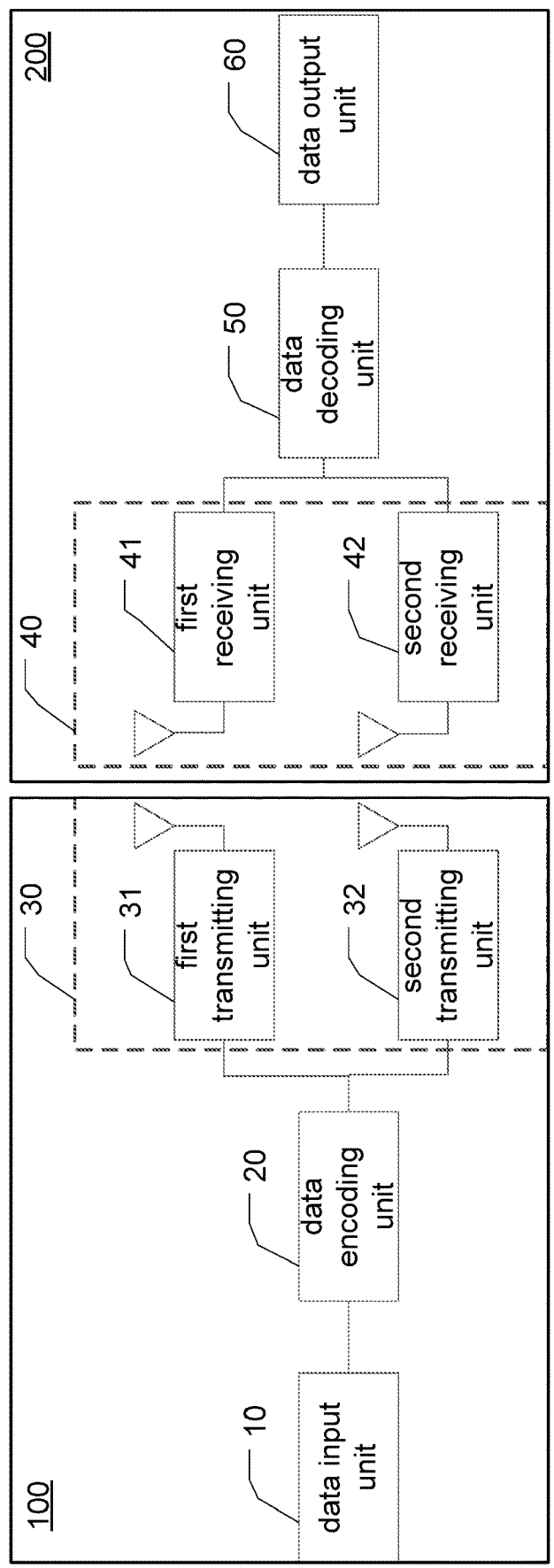
FIG. 1 is a schematic structural diagram of a data transmission system according to an embodiment.

As shown in FIG. 1, a data transmission system provided by one embodiment of the present disclosure may include a transmitter 100 and a receiver 200. The transmitter 100 may be coupled to a data source such as a camera, a PAD or a mobile phone to access to a first data stream from the data source and may transmit the inputted first data stream in a wireless manner. The receiver 200 may correspondingly receive signals transmitted by the transmitter 100 and acquire a second data stream after processing. The second data stream should be the same as the first data stream at best; that is, there is no data loss after wirelessly transmitting the first data stream. The receiver 200 may, in practice, output the second data stream to a display and/or a sound playback device and/or other data processing devices for other application of the second data stream, such as uploading the second data stream to various APPs.

The transmitter 100 may include a data input unit 10, a data encoding unit 20, and a wireless transmitting unit 30. The data input unit 10 may be configured to receive an external input signal and convert it into a preset data format which may be suitable for the subsequent processing by the data encoding unit 20. The data input unit 10 may support various interfaces in practice, including a USB interface, an HDMI interface, and so on. The external input signal, i.e. the first data stream may be video data, audio data and/or text data.

The data encoding unit 20, connected to an output of the data input unit, may perform processing including encoding on the input data to acquire coded transmission data which may be usually split into a plurality of data packets for facilitating transmission. The coded transmission data may be split into the plurality of data packets in different ways by the data encoding unit 20 in accordance with features of the external input data such as signal type or quantity. Further, during splitting the coded transmission data into the plurality of data packets, the data encoding unit 20 may also number each data packet; for example, the plurality of split data packets are numbered with 1, 2, 3, . . . , N, in which N is an integer greater than or equal to 1. The split data packets may each be transferred by the data encoding unit to the wireless transmitting unit 30 which may then transmit the data packets in a certain order of the numbers of the data packets to respective receivers.

The wireless transmitting unit 30 may be configured to convert the same coded transmission data into transmission signals of different frequency bands transmitted in multiple paths, and then wirelessly transmit them to respective receivers, where signals transmitted in each path have a different transmission frequency band from the signals transmitted in other paths.

The receiver 200 may include a wireless receiving unit 40, a data decoding unit 50, and a data output unit 60. The wireless receiving unit 40 may be configured to receive the transmission signals transmitted in the multiple paths by the wireless transmitting unit, and transfer them to the data decoding unit 50. The data decoding unit 50 may be configured to perform data fusion on the received transmission signals to generate coded received data and decode the coded received data to acquire decoded data which is also the second data stream.

In an embodiment, the wireless transmitting unit 30 may include a first transmitting unit 31 and a second transmitting unit 32, and the wireless receiving unit 40 may include a first receiving unit 41 and a second receiving unit 42. The first transmitting unit 31 and the first receiving unit 41 may form a communication link in a one-to-one correspondence manner, and the second transmitting unit 32 and the second receiving unit 42 may also form another communication link in a one-to-one correspondence. The first transmitting unit 31 and the second transmitting unit 32 may use different frequency bands to send the same coded transmission data to the first receiving unit 41 and the second receiving unit 42, respectively.

The present disclosure may be illustrated in detail below by taking transmission via WIFI as an example.

First Embodiment

Figure 2:
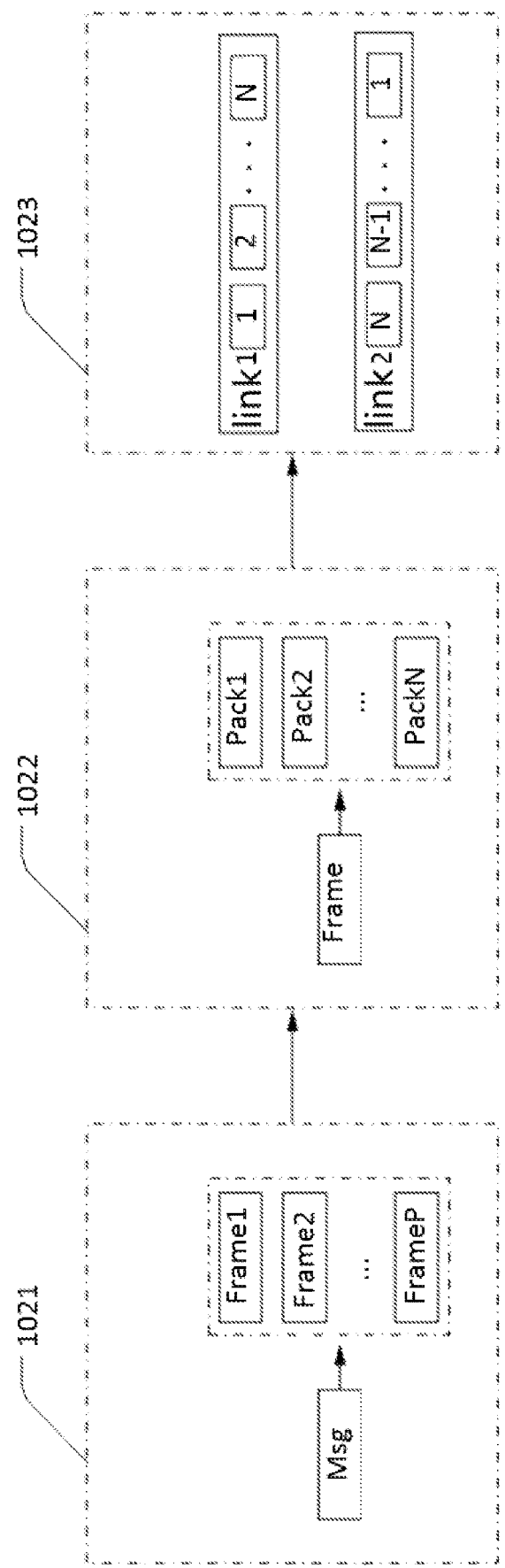
FIG. 2 is a schematic diagram of the image transmission of a transmitter.
Figure 3:
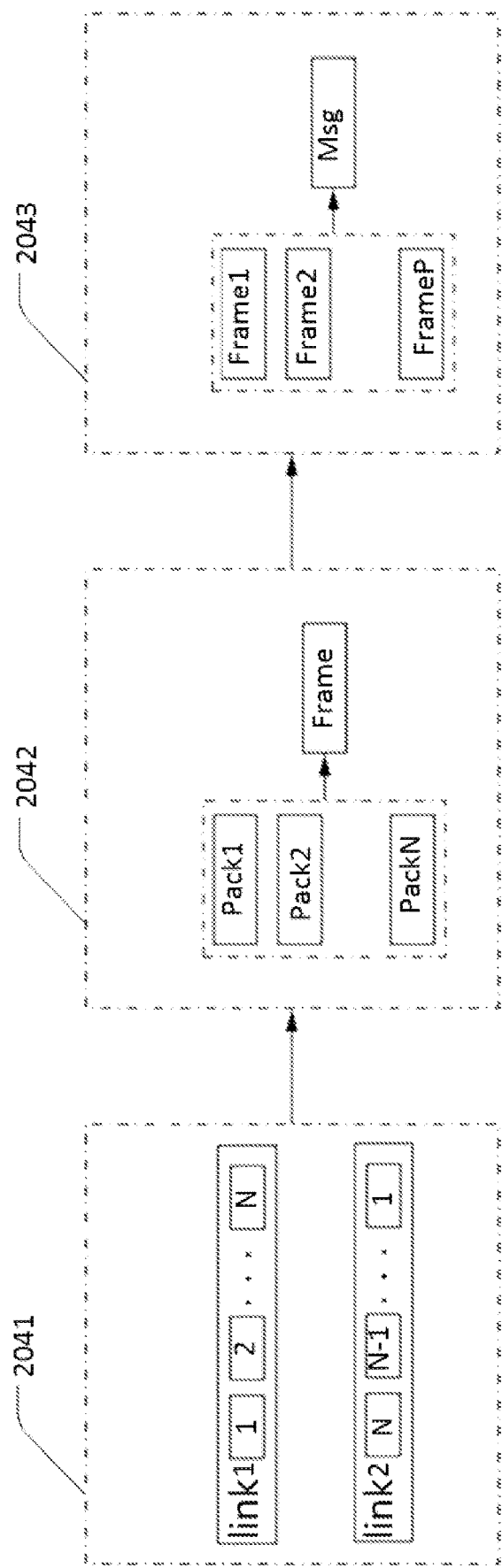
FIG. 3 is a schematic diagram of the image transmission of a receiver.

As shown in FIGS. 1-3, a data transmission system provided according to this embodiment of the present disclosure may include a transmitter and a receiver. The transmitter may include a data input unit 10 having a video input unit configured to convert input video data, a data encoding unit 20 having a video encoding unit that is connected with the video input unit and configured to convert the video data into a plurality of frames of image data and then convert each frame of image data into N data packets, and a wireless transmitting unit 30 having a first transmitting unit 31 and a second transmitting unit 32 that are coupled to an output of the video encoding unit respectively. It should be noted that each frame of image data in this embodiment is data obtained by compressing each corresponding frame of image data of the video data.

The receiver may include a wireless receiving unit 40, a data decoding unit 50 having a video decoding unit, and a data output unit 60 having a video output unit. The wireless receiving unit 40 may have a first receiving unit 41 wireless coupled to the first transmitting unit 31 and a second receiving unit 42 wireless coupled to the second transmitting unit 32. The first transmitting unit 31 may be configured to transmit the N data packets of each frame of image data in a predetermined first frequency band, and the first receiving unit 41 may be configured to receive the N data packets of each frame of image data sent by the first transmitting unit 31. The second transmitting unit 32 may be configured to transmit the N data packets in a predetermined second frequency band to the second receiving unit 42, and the second receiving unit 42 may be configured to receive the N data packets of each frame of image data from the second transmitting unit 32. The first frequency band and the second frequency band may be different.

The first receiving unit 41 and the second receiving unit 42 may both be coupled to the video decoding unit coupled to the video output unit. The video decoding unit may be configured to acquire the N data packets from the first receiving unit 41 and the N data packets from the second receiving unit 42, perform data fusion on the double N data packets from the first and second receiving units 41, 42 to get a complete frame of image data to hereby acquire the multiple frames of image data in sequence, and concatenate the multiple frames of image data to acquire complete video data to send it to the video output unit.

The video output unit may be configured to receive and output the video data output by the video decoding unit.

Both the first receiving unit 41 and the second receiving unit 42 may both be WIFI receiving units, and the first transmitting unit 31 and the second transmitting unit 32 be WIFI transmitting units.

Data is wirelessly transmitted in two paths in this embodiment of the present disclosure. Theoretically, two frames of image data transmitted in the two paths may be completely the same; however, part of the data may be missing or wrong due to loss and interference during the transmission in practice. Accordingly, the two frames of image data may need to be fused to get a complete frame of image data to output before decoding by the video decoding unit.

It is beneficial to make the first transmitting unit 31 and the second transmitting unit 32 operate in different frequency bands in this embodiment, since the possibility of two different frequency bands being interfered at the same time is much lower than that of a single frequency band being interfered. Moreover, for one and the same frame of image data, the probability of the same bytes of data being interfered in the two frames of image data wirelessly transmitted in the two paths may further be greatly reduced. By removing the interfered data in the two frames of image data and fusing the rest of useful data, a complete frame of image data can thus be acquired.

The anti-interference of the system in wireless transmission, as well as the stability of video and image transmission, can greatly be improved in the technical solution of this embodiment compared with existing systems. Further, no black screen occurs during switching due to no frequency band switching.

In a preferable embodiment of the present disclosure, the frequency band of signal transmission between the first receiving unit 41 and the first transmitting unit 31 may be 2.4 GHz, and the frequency band of signal transmission between the second receiving unit 42 and the second transmitting unit 32 may be 5 GHz.

It is known that image transmission always requires high bandwidth, and WIFI, a mature wireless network technology, has advantages of high bandwidth, low cost and so on. Both the transmitting and receiving units use WIFI technology in this embodiment; specifically, the first transmitting and receiving units may be 2.4 GHz WIFI transceiver and receiver, and the second transmitting and receiving units may be 5 GHz WIFI transceiver and WIFI receiver. In this respect, the advantage of such design is that the 2.4 GHz and 5 GHz frequency bands are far apart, and the WIFI units may not interfere with each other.

The 2.4 GHz WIFI unit has strengths of relatively longer wavelength and stronger diffraction and weaknesses of fewer channels, while the 5 GHz WIFI unit is poor in diffraction but has more channels and larger data bandwidth. Such two kinds of WIFI units can be complementary to further improve the reliability of transmission. When delivering image data, the first and second transmitting units 31, 32 may send one frame of image data synchronously or sequentially. In a preferable example, the image data may be transmitted by the two transmitting units at the same time so as to reduce transmission delay.

The frequency bands of signal transmission between the first receiving unit 41 and the first transmitting unit 31, and between the second receiving unit 42 and the second transmitting unit 32, may also preferably all be 5 GHz in an embodiment.

The anti-interference of the system in wireless transmission may also be improved by taking advantage of the 5 GHz WIFI units and an additional band-pass filter, because the WIFI units has the merits of higher bandwidth and more channels and the band-pass filter may restrict the RF signals of the WIFI units within their operating frequency bands (in which one pair of transmitting and receiving units may operate in the U-NII-1 band, and another pair of transmitting and receiving units may operate in the U-NII-2 or U-NII-3 band) so as to avoid mutual interference between two 5 GHz WIFI signals.

With the above-mentioned dual-frequency wireless image transmission system, an image transmission method provided in the embodiment may include the following steps:
- step 1: splitting video data from the video input unit into a plurality of frames of image data by the video encoding unit;
- step 2: splitting each frame of image data into N data packets and numbering each data packet (e.g. with 1, 2, ..., N) by the video encoding unit;
- step 3: transmitting the N packets of data respectively with two WIFI transmitting units to two WIFI receiving units by using different frequency bands,
wherein the transmission between the WIFI transmitting units and the WIFI receiving units may be implemented by: transmitting the N data packets of each frame in a sequential numbering manner between one pair of WIFI transmitting and receiving units, and transmitting the N data packets of each frame in a reversely sequential numbering manner between the other pair of WIFI transmitting and receiving units.
- step 4: transferring the N data packets to the video decoding unit by each of the two receiving units after they each receive the N data packets respectively;
- step 5: checking whether each data packet is correct by the video decoding unit, when it is correct, proceeding to a next step, and when it is incorrect, requesting the WIFI transmitting units to resend the data packet; wherein this step may specifically include:
- step 51: checking whether each packet of data in the current frame in one WIFI receiving unit is correct by the video decoding unit, when a certain numbered packet is incorrect, checking whether the same numbered packet in the frame in the other WIFI receiving unit is correct; and
- step 52: when it is correct, execute step 6; and when the same numbered packets of the current frames received in the two receiving units are incorrect, requesting the two WIFI transmitting units to resend the same numbered packet;
- step 6: assembling all the correct N data packets of the current frame into one frame of image data, and hereby sequentially restoring the plurality of frames of image data; and
- step 7: concatenating the plurality of frames of image data into a complete video data.

By means of using additional transmitting and receiving units to achieve transmissions and receptions in two paths, the system according to this embodiment can improve its anti-interference which may be poor in the case of wirelessly transmitting in a single frequency band, realizing high-reliability transmission at low cost or in complex wireless communication environment, also expanding the applications of the data transmission system.

Second Embodiment

The wireless transmitting unit 30 and the wireless receiving unit 40 in the data transmission system provided in this embodiment may both be WIFI units. The wireless transmitting unit 30 may include the first transmitting unit 31 and the second transmitting unit 32 that are WIFI units with different frequency bands.

The first transmitting unit 31 and the second transmitting unit 32 may each receive the coded transmission data output by the data encoding unit, and convert it into transmission signals transmitted in multiple paths with different frequency bands. That is, the coded transmission data is transmitted in different frequency bands. The first receiving unit 41 and the second receiving unit 42 may receive the transmission signals sent by the first transmitting unit 31 and the second transmitting unit 32 respectively, and transmit the received two groups of transmission signals to the data decoding unit 50. The data decoding unit 50 may perform data fusion on the received two groups of transmission signals to acquire coded received data, and decode the coded received data to acquire decoded data. The data output unit 60 may output the decoded data.

The coded transmission data may be data acquired after the data encoding unit 20 encodes the data input by the data input unit 10. The data input unit 10 may receive an external input signal and convert it into data in a preset data format. The external input signal may be various types of signals in this embodiment, such as audio signals, video signals, and so on. Though there may be some differences in data encoding and decoding for the external input signal due to different signal type, the way of data transmission is basically the same.

After the data encoding unit 20 transfers the coded transmission data to the first transmitting unit 31 and the second transmitting unit 32 respectively, a first transmission signal having a preset first frequency band and a second transmission signal having a preset second frequency band may be generated in the first transmitting unit 31 and the second transmitting unit 32 respectively to acquire transmission signals in different frequency bands. In an example, the frequency band of the first transmitting unit 31 may be 2.4 GHz, and the frequency band of the second transmitting unit 32 may be 5 GHz. Of course, the values of the first and second frequency bands may be various, which is not be repeated here.

The data transmission method between the transmitter and the receiver in this embodiment will be described in detail below.

Figure 4:
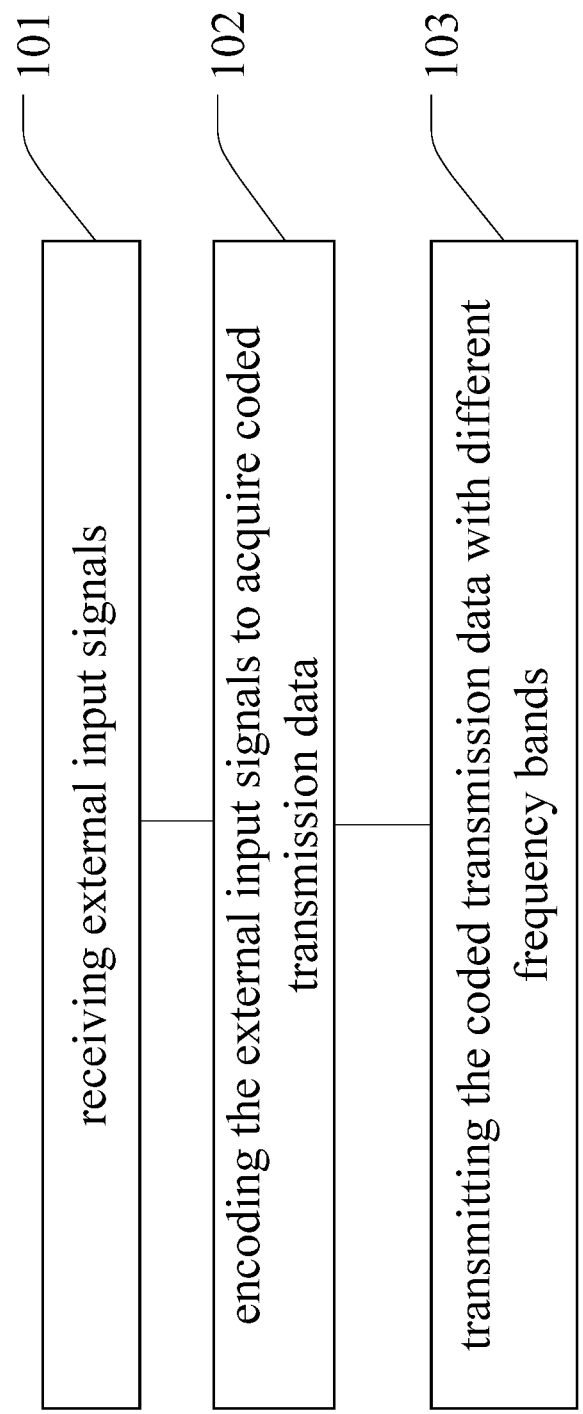
FIG. 4 is a flow chart of data processing and transmitting of a transmitter according to an embodiment.

As shown in FIG. 4, the procedure of the transmitter processing and transmitting data in an embodiment may include the following steps:
- step 101: receiving an external input signal and converting it into data in a preset data format by the data input unit 10;
- step 102: encoding the external input signal to acquire coded transmission data and splitting the coded transmission data into a plurality of data packets by the data encoding unit 20; and
- step 103: transmitting the coded transmission data with a first frequency band by the first transmitting unit 31, and transmitting the coded transmission data with a second frequency band by the second transmitting unit 32.

In an example, the coded transmission data may be directly split into a plurality of data packets in step 102. In another example, in step 102, when the external input signal is a video signal, the transmitter may split the coded transmission data into a plurality of data packets and transmit them, which may specifically include the following steps, as shown in FIG. 2:

step 1021: splitting a coded transmission data Msg into P frames of image data, i.e. Frame1, Frame2, Frame3, . . . , FrameP, where P is an integer greater than 1;

step 1022: splitting each frame of image data into N data packets, i.e. Pack1, Pack2, Pack3, . . . , PackN, where N is an integer greater than 1, and 1, 2, 3, . . . , N are the serial numbers of the data packets.

step 1023: transmitting the N data packets in a certain sequence of the numbers of the packets via a communication link 1 formed by the first transmitting and receiving units 31, 41 and a communication link 2 formed by the second transmitting and receiving units 32, 42 to respective receivers.

The external input signal is only split twice in this embodiment; it may be understood that the external input signal may also be split three or more times to acquire more data packets in other embodiments. For example, the external input signal may be first split into multiple first-level data, each of the first-level data may then be split into multiple second-level data, and finally each of the second-level data may be split into multiple packets of third-level data.

Figure 5:
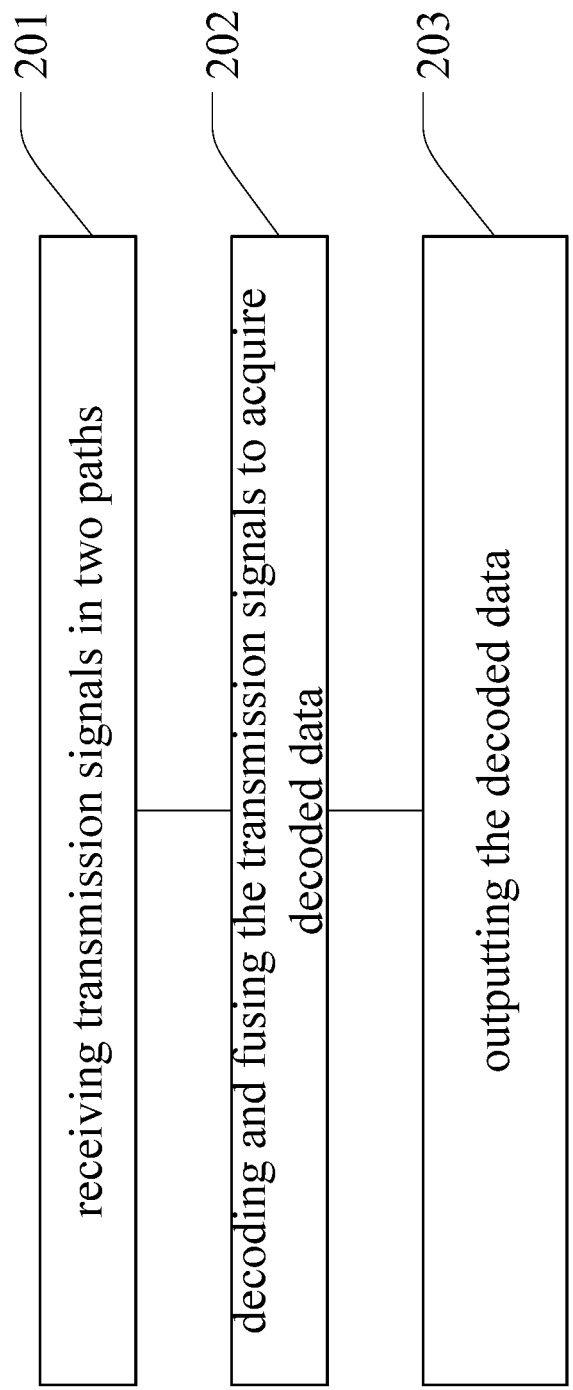
FIG. 5 is a flow chart of data receiving and processing of a receiver according to an embodiment.

As shown in FIG. 5, the procedure of the receiver processing and transmitting data in an embodiment may include the following steps:

step 201: receiving transmission signals from the first transmitting unit 31 by the first receiving unit 41, receiving other transmission signals from the second transmitting unit 32 by the second receiving unit 42, and the received two groups of data packets of the transmission signals may be, according to the order of receiving packets, output by the first and second receiving units 41, 42 sequentially to the data decoding unit 50 for decoding;

step 202: performing data fusion on the received two groups of transmission signals to acquire coded received data and decoding the coded received data to acquire decoded data by the data decoding unit 50; and step 203: outputting the decoded data by the data output unit 60.

In an example, the step of performing data fusion on the received two groups of transmission signals to acquire coded received data may include:

checking the correctness of each data packet received in one path and the correctness of each data packet received in another path respectively, and when a data packet of a certain number is incorrect, dropping the incorrect data packet and acquiring a correct one from the same numbered data packet of another path; and assembling all correct data packets into coded received data. In addition, when the same numbered data packets received in the two paths are incorrect, the data decoding unit 50 may output feedback to transmitter, requesting the wireless transmitting unit 30 to resend the data packet of the number. The aforesaid correctness of data packets may be performed by using common verification methods of existing data processing. In this embodiment, any existing verification method may be used to perform correctness check.

Since the content of a data packet may be missing or damaged due to the susceptibility to interference during the transmission of the data packet, the data decoding unit 50 may need to check the correctness of each received data packet.

In an embodiment, the plurality of data packets may be directly assembled into coded received data in step 202. In another embodiment, in step 202, when the external input signal is a video data, the step of assembling the plurality of data packets into coded received data may, as shown in FIG. 3, include the following steps:

step 2041: checking the correctness of each data packet received in the communication links 1, 2, and arranging the checked correct data packets according to the positive order of the numbers of the packets to acquire the checked correct packets Pack1, Pack2, Pack3, . . . , PackN;

step 2042: assembling the checked correct packets Pack1, Pack2, Pack3, . . . , PackN into one frame of image data, and hereby sequentially recovering the plurality of frames of image data Frame1, Frame2, Frame3, . . . , FrameP; and step 2043: concatenating the plurality of frames of image data into a complete video data.

It should be noted that the first transmitting unit 31 and the first receiving unit 41 may be two WIFI units with the same frequency band, and the second transmitting unit 32 and the second receiving unit 42 may also be two WIFI units with the same frequency band. It may be appreciated that the same WIFI unit may be configured to transmit signals as well as receive signals based on actual usage. In this respect, the feedback output by the data decoding unit 50 may first be transmitted to the first and second transmitting units 31, 32 via the first and second receiving units 41, 42 respectively, and then be transferred to the data encoding unit 20 via the first and second transmitting units 31, 32.

Figure 6:
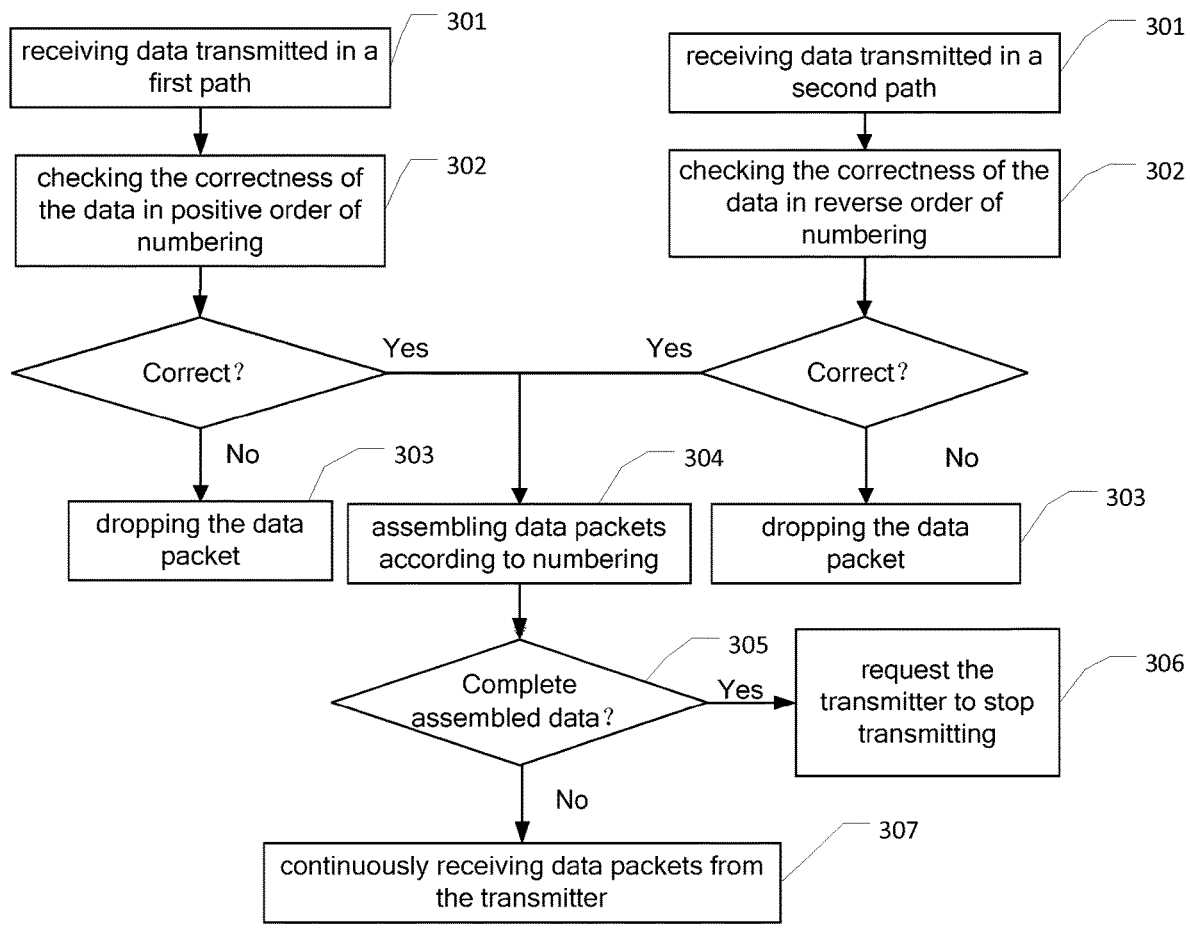
FIG. 6 is a flowchart of data receiving and processing of a receiver according to another embodiment.

In one embodiment, the first and second transmitting units 31, 32 may transmit the data packets in opposite order of the numbers of the data packets. For example, the first transmitting unit 31 may transmit the plurality of data packets in the positive order of the numbers of the data packets, while the second transmitting unit 32 may transmit the plurality of data packets in the reverse order of the numbers of the data packets. As shown in FIG. 6, the procedure of the receiver processing and transmitting data may include the following steps:

step 301: receiving data transmitted in a first path by the first transmitting unit 31 by the first receiving unit 41 and data transmitted in a second path by the second transmitting unit 32 by the second receiving unit 42, wherein the numbers of the plurality of data packets transmitted in the first path are in positive order, and the numbers of the plurality of data packets transmitted in the second path are in reverse order;

step 302: the data decoding unit 50 checking the correctness of the data transmitted in the first path according to the positive order of the numbers of data packets (for example, starting the correctness verification from the data packet numbered 1 and verifying sequentially in the order of 1, 2, 3, . . . ) and checking the correctness of the data transmitted in the second path according to the reverse order of the numbers of data packets (for example, starting the correctness verification from the data packet numbered N and verifying sequentially in the order of N-1, N-2, N-3, . . . );

step 303: when a data packet with a certain number in each path is incorrect, dropping the incorrect data packet;

step 304: assembling correct data packets from the two paths according to the numbers of the data packets.

step 305: detecting whether the assembled data packets are complete in real time;

step 306: when the assembled data packets are complete, outputting information to the transmitter by the data decoding unit to make the first and second transmitting units 31, 32 stop transmitting data packets and prepare for transmission of next set of N data packets; and step 307: when the assembled data packets are incomplete, continuously receiving the data packets from the first transmitting unit 31 by the first receiving unit 41 in the positive order of the numbers of data packets, and continuously receiving the data packets from the second transmitting unit 32 by the second receiving unit 42 in the reverse order of the numbers of data packets.

In this way, when the video decoding unit 50 has performed the correctness verification on half of the number of data packets in each path, such verification of all data packets can be completed under ideal conditions without interference. Even in the case of interference, the amount of data packets for correctness verification can be reduced, so that there is no need to check the correctness of all data packets for each path; thereby greatly enhancing the efficiency of correctness checking of data packets, and improving the efficiency of data transmission.

In another embodiment, the first transmitting unit 31 and the second transmitting unit 32 may also transmit in the same order of the numbers of data packets; and in this case, similar to the transmission in reverse order, the data decoding unit 50 may sequentially check the correctness of each data packet transmitted in the two paths in the order of receiving the data packets by the first and second receiving units 41, 42.

In the foregoing embodiments, the plurality of data packets may be transmitted by the first and second transmitting units 31, 32 in a synchronous or asynchronous manner. In the case of synchronous transmission, the first receiving unit 41 and the second receiving unit 42 may receive data packets transmitted in two paths synchronously and transfer them to the data decoding unit for synchronous decoding. In the case of asynchronous transmission (for example, the first transmitting unit 31 transmits before the second transmitting unit 32), data packets transmitted in the first path by the first transmitting unit 31 may be first received by the first receiving unit 41 and checked its correctness; when a data packet of a certain number is incorrect due to interference, the correctness of the same numbered data packet transmitted by the second transmitting unit 32 in the second path may be waited to be received by the second receiving unit 42 for checking. In such situation, the incorrect data packet in the first path may be replaced by the correct data packet in the second path for data assembly. Accordingly, in terms of overall data transmission efficiency, there is less data transmission delay in synchronous transmission than in asynchronous transmission.

Figure 7:
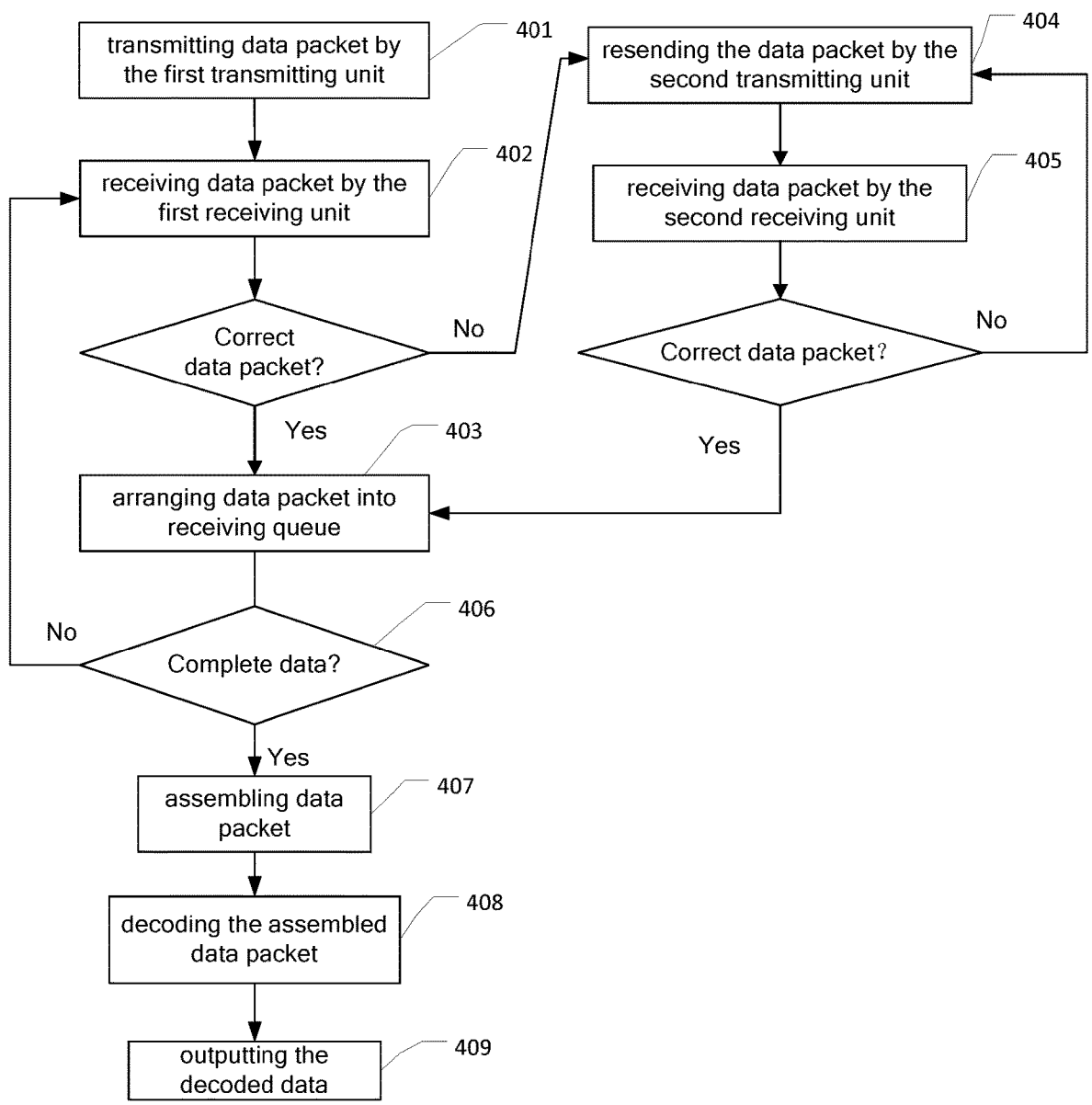
FIG. 7 is a flowchart of a data transmission method according to an embodiment.

In one embodiment, the first transmitting unit 31 and the second transmitting unit 32 need not all be used to transmit data. For example, the first transmitting unit 31 may be used as a main transmitting unit and the second transmitting unit 32 as an auxiliary transmitting unit. Normally, only the main transmitting unit is used for transmission, and when the receiver checks out that a certain data packet transmitted by the main transmitting unit is incorrect, the auxiliary transmitting unit is used for transmitting the data packet. Correspondingly, a data transmission method based on such main and auxiliary transmitting units may be shown in FIG. 7, and a flowchart thereof may include the following steps:

step 401: transmitting the M-th data packet by the first transmitting unit 31 with the first frequency band;

step 402: receiving the M-th data packet from the first transmitting unit 31 by the first receiving unit 41;

step 403: checking by the data decoding unit 50 whether the M-th data packet from the first transmitting unit 31 is correct, and when it is correct, arranging the M-th data packet into a receiving queue;

step 404: when the M-th data packet is incorrect, sending a command to the transmitter for requesting the second transmitting unit 32 to send the M-th data packet, and then resending the M-th data packet by the second transmitting unit 32;

step 405: receiving the M-th data packet from the second transmitting unit 32 by the second receiving unit 42, checking by the data decoding unit 50 whether the M-th data packet from the second transmitting unit 32 is correct, and when it is correct, arranging the M-th data packet into the receiving queue, otherwise, when it is incorrect, requesting the second transmitting unit 32 to resend;

step 406: checking whether the data packets in the receiving queue are complete, and when it is incomplete, continuously receiving the data packets from the first transmitting unit 31 by the first transmitting unit 41;

step 407: when the data packets are complete, assembling the data packets;

step 408: decoding the assembled data packets to obtain decoded data; and step 409: outputting the decoded data.

That is, the first transmitting unit 31 may first transmit a data packet of a certain number to the receiver; when the data decoding unit 50 verifies that the numbered data packet is correct, the second transmitting unit 32 may not need to transmit the numbered data packet; and when the numbered data packet checked by the data decoding unit 50 is incorrect, it may send a command to the transmitter for signal transmission, the first transmission unit 31 may continue to transmit the next numbered data packet, and the second transmitting unit 32 may transmit the same numbered data packet to the receiver after receiving the signal transmission command. In this way, the first transmitting unit 31 is served as the main transmitting unit, and the second transmitting unit 32 is served as the auxiliary transmitting unit. During normal operation, only the main transmitting unit transmits data packets, and only when a data packet of a certain number from the main transmitting unit is incorrect, the auxiliary transmitting unit may transmit the same numbered data packet separately to replace the incorrect data packet transmitted by the main transmitting unit. In summary, the main transmitting unit is not affected when transmitting data, which can save data transmission time; moreover, the auxiliary unit is only used to retransmit incorrect data packets, thus lowering its utilization and power consumption.

In addition to the WIFI unit, the wireless transmitting unit may also be selected from wireless modules such as Bluetooth, 3G module, 4G module, 5G module, Sub-G module, millimeter wave module and LTE module. Correspondingly, the wireless receiving unit may also be selected from wireless units such as Bluetooth, 3G module, 4G module, 5G module, Sub-G module, millimeter wave module, and LTE module.

It should be noted that, the transmitter may be an independent device with data processing function, specifically, after signals collected by an acquisition device are input into the transmitter, it may perform subsequent processing including encoding on the signals and transmit the coded transmission data to the receiver. In another example, the transmitter may also be a chip module having a data processing function, so that it can be built in the acquisition device; in this case, the acquisition device may first collect signals, perform processing such as encoding on the signals, and transmit the processed data to the receiver.

Similar to the transmitter, in one embodiment, the receiver may be an independent device with data processing functions, specifically, the receiver may perform data fusion and decoding on the data from the transmitter, and output the acquired decoded data to other devices for subsequent processing, for example, the data may be output to a display for displaying or to a computer for further processing. In another example, the receiver may also be a chip module, which can be built-in in other devices; in this case, the receiver may decode the received data and send the decoded data a data processing unit in other device for subsequent processing.

Third Embodiment

The difference between the data transmission system provided in this embodiment and the second embodiment is that the first transmitting unit 31 and the second transmitting unit 32 are both 5 GHz WIFI units.

It should be noted that although the first transmitting unit 31 and the second transmitting unit 32 are both 5 GHz WIFI units, their working channels may be different in practical application; accordingly, the frequency bands of the first and second transmitting units 31, 32 are also different. In this embodiment, the first transmitting unit 31 may operate in the frequency band of U-NII-1, and the second transmitting unit 32 may operate in the U-NII-3. In this way, although the first transmitting unit 31 and the second transmitting unit 32 are both 5 GHz WIFI units, due to the different working channels and thus different working frequency bands (in which the first transmitting unit has the first frequency band and the second transmitting unit has the second frequency band), the interference between the first transmitting unit 31 and the second transmitting unit 32 can be minimized.

Figure 8:
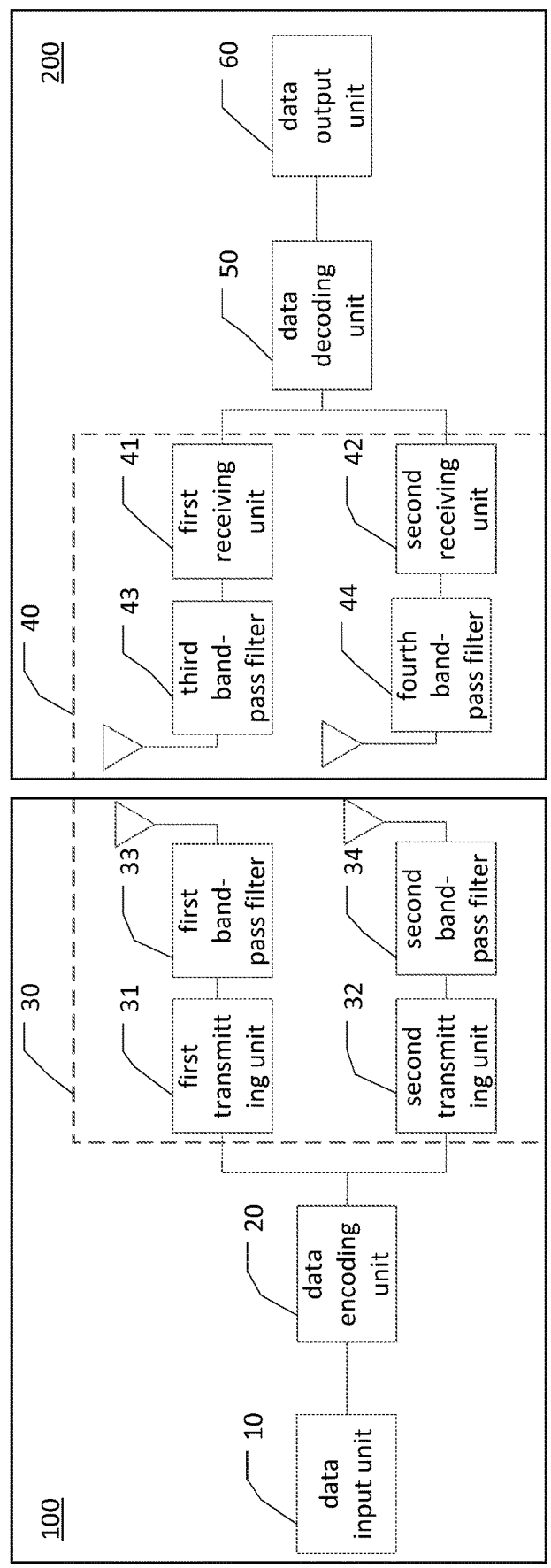
FIG. 8 is a schematic structural diagram of a data transmission system according to another embodiment.

Referring to FIG. 8, in an embodiment, the wireless transmitting unit 30 may further include a first band-pass filter 33 and a second band-pass filter 34. The first band-pass filter 33 may be coupled to an output of the first transmitting unit 31 for limiting the frequency band of the transmission signal output by the first transmitting unit 31 to the first frequency band.

The second band-pass filter 34 may be coupled to an output of the second transmitting unit 32 for limiting the frequency band of the transmission signal output by the second transmitting unit 32 to the second frequency band.

Since WIFI units usually have a certain bandwidth and multiple channels, the first and the second transmitting units 31, 32 may operate in different channels, that is, the first transmitting unit 31 and the second transmitting unit 32 may operate in different frequency bands. For example, a 5 GHz WIFI unit usually has three frequency bands: U-NII-1, U-NII-2, and U-NII-3. In this embodiment, the first transmitting unit 31 may select the frequency band of U-NII-1, and the second transmitting unit 32 may select U-NII-3. In this way, the transmitting frequency bands of the first and second transmitting units 31, 32 are different, which can reduce mutual interference. Correspondingly, the first band-pass filter 33 may allow signals with the first frequency band transmitted by the first transmitting unit 31 to pass; and the second band-pass filter 34 may allow signals with the second frequency band transmitted by the second transmitting unit 32 to pass.

In this embodiment, the first and second transmitting units 31, 32 may be 2.4 GHz WIFI units or 5 GHz WIFI units; however, since there are more interference signals in the 2.4 GHz WIFI units, the 5 GHz WIFI units may be preferred.

Similar to the wireless transmitting unit 30, the first and second receiving units 41, 42 may be 5 GHz WIFI units. Correspondingly, in order to enable the first receiving unit 41 to receive transmission signals of the first frequency band, and the second receiving unit 42 to receive transmission signals of the second frequency band, the wireless receiving unit 40 may further include a third band-pass filter 43 and a fourth band-pass filter 44. The third band-pass filter 43 may be connected to the input of the first receiving unit 41 for limiting the frequency band of the transmitted signals received by the first receiving unit 41 to the first frequency band; and the fourth band-pass filter 44 may be connected to the input of the second receiving unit 42 for limiting the frequency band of the transmitted signals received by the second receiving unit 42 to the second frequency band. The first frequency band is the working frequency band of the third filter, and the second frequency band is the operating frequency band of the fourth filter, thereby realizing the reception of transmitted signals in different frequency bands.

It should be noted that the data transmission method of the transmitter and the receiver in this embodiment is similar to that of the second embodiment and, referring to aforesaid detailed description to specific implementation of the data transmission method in the second embodiment, it will not be repeated here.

In summary, the data transmission method provided by the embodiments of the present disclosure can transmit external input signals in two paths with different frequency bands, and can also transmit external input signals in more than two paths with different frequency bands. The transmission method of using two or more paths is similar to the aforesaid transmission method of using two paths, so it will not be described in detail here.

In the embodiment of the present disclosure, the transmitter encodes the external input signal to acquire coded transmission data, and then transmits the same coded transmission data to the corresponding receiver through multiple transmission units in different frequency bands; and the receiver performs data fusion on the received transmission signals to acquire coded received data, and decodes the coded received data to acquire and output the decoded data. Since the received external input signals are split into a plurality of transmission signals of different frequency bands by the transmitter and are transmitted to the receiver, the signals are not susceptible to the same frequency interference in the surrounding system environment during transmission, improving the anti-interference of the data transmission system, realizing high-reliability transmission at low cost or in a complex wireless environment, also expanding the applications of the data transmission system.

The invention claimed is:
1. A video data transmission system, comprising a transmitter and a receiver, the transmitter having a data input unit including a video input unit and a data encoding unit including a video encoding unit coupled to the video input unit;

the video input unit being configured to convert inputted video data;

the video encoding unit, coupled to an output of the video input unit, being configured to convert the video data from the video input unit into a plurality of frames of image data, and convert each frame of image data into N data packets, where N is a positive integer;

the video encoding unit having an output coupled to a first transmitting unit and a second transmitting unit respectively and being configured to transmit data packets of a same frame from the plurality of frames to the first transmitting unit and the second transmitting unit in different frequency bands respectively, the first transmitting unit being configured to send the N data packets of a frame in a predetermined first frequency band, and the second transmitting unit being configured to send the N data packets of the frame in a predetermined second frequency band, where the first frequency band is different from the second frequency band;

the receiver comprising a first receiving unit wirelessly coupled to the first transmitting unit, a second receiving unit wirelessly coupled to the second transmitting unit, a data decoding unit including a video decoding unit, and a data output unit;

the first receiving unit being configured to receive the N data packets of the frame sent by the first transmitting unit, and the second receiving unit being configured to receive the N data packets of the frame sent by the second transmitting unit;

the data output unit including a video output unit coupled to the video decoding unit coupled to the first receiving unit and the second receiving unit;

the video decoding unit being configured to perform data fusion on acquired the N data packets received by the first receiving unit and the N data packets received by the second receiving unit into one complete frame of image data, and concatenate the plurality of frames of data recovered sequentially into complete video data; and the data output unit being configured to receive and output the video data output by the video decoding unit.

2. A video data transmission method used for a video data transmission system, wherein the video data transmission system comprises a transmitter and a receiver, the transmitter has a video encoding unit, a first transmitting unit and a second transmitting unit, and the receiver has a video decoding unit, a first receiving unit and a second receiving unit;

the video data transmission method comprises following steps:

step 1: splitting video data from a video input unit into a plurality of frames of image data by the video encoding unit;

step 2: splitting each individual frame of image data into N data packets and numbering each data packet by the video encoding unit;

step 3: for each individual frame, transmitting the N data packets of a same frame from the plurality of frames to the first transmitting unit and the second transmitting unit by the video encoding unit in different frequency bands respectively, wherein the first transmitting unit transmits the N data packets of a frame to the first receiving unit with a first frequency band, the second transmitting unit transmits the same N data packets to the second receiving unit with a second frequency band different from the first frequency band, or a frequency band used between the first transmitting unit and the first receiving unit is different from a frequency band used between the second transmitting unit and the second receiving unit;

step 4: transferring the N data packets to the video decoding unit by the first and second receiving units after they receive the N data packets respectively;

step 5: checking whether each data packet of the frame from one of the first and second receiving units is correct by the video decoding unit, when a data packet of a certain number is incorrect, then checking whether the same numbered data packet of the frame from the other of the first and second receiving units is correct, when it is correct, proceeding to a next step, and when it is incorrect, requesting the first transmitting unit and the second transmitting unit to resend the same numbered data packet;

step 6: assembling all correct N data packets of the frame into one frame of image data, and hereby sequentially recovering the plurality of frames of image data by the video decoding unit; and step 7: concatenating the plurality of frames of image data into a complete video data and outputting it to a video output unit by the video decoding unit.

3. A data transmission system, comprising a transmitter and a receiver;

the transmitter comprising:

a data input unit, configured to receive an external input signal and convert it into data in a preset data format, the external input signal including video data, and the data being video data or image data;

a data encoding unit coupled to an output of the data input unit, configured to encode input data to acquire coded transmission data which is then split into a plurality of data packets; and a wireless transmitting unit, configured to convert the same coded transmission data into transmission signals with different frequency bands transmitted in multiple different paths, and transmit them to respective receivers;

the receiver comprising:

a wireless receiving unit, configured to receive the transmission signals transmitted in the multiple different paths from the wireless transmitting unit;

a data decoding unit coupled to the wireless receiving unit, configured to perform data fusion on the transmission signals transmitted in multiple paths and received by the wireless receiving unit to acquire coded received data and decode it to acquire decoded data; and a data output unit, configured to output the decoded data.

4. The system according to claim 3, wherein the data encoding unit is configured to number each data packet of the coded transmission data; and the data decoding unit is configured to check whether each data packet received in one preset path of the multiple paths is correct, and when a data packet of a certain number is incorrect, acquire a same numbered data packet that is correct from another path and assemble correct data packets into coded received data.

5. The system according to claim 4, wherein the data decoding unit is further configured to, when same numbered data packets in all paths are incorrect, output feedback to the transmitter to request the wireless transmitting unit to resend the same numbered data packets.

6. The system according to claim 3, wherein the wireless transmitting unit comprises a first transmitting unit and a second transmitting unit, and the wireless receiving unit comprises a first receiving unit and a second receiving unit;

the first transmitting unit and the first receiving unit form a communication link in a one-to-one correspondence manner, the second transmitting unit and the second receiving unit also form another communication link in a one-to-one correspondence manner, and the first transmitting unit and the second transmitting unit use different frequency bands to send the same coded transmission data to the first receiving unit and the second receiving unit, respectively.

7. The system according to claim 6, wherein
the data decoding unit is configured to assemble the coded received data corresponding to the data packets that have been validated for correctness.

8. The system according to claim 7, wherein the data decoding unit is configured to check whether the coded received data is complete, and when it is complete, output information to the transmitter about stop transmitting so that the first and second transmitting units stop sending data packets.

9. The system according to claim 6, wherein the first and second transmitting units are two WIFI units respectively, and the first and second receiving units are also two WIFI units respectively.

10. The system according to claim 9, wherein the first and second transmitting units are WIFI units with different frequency bands; and
the first and second transmitting units are configured to receive the coded transmission data output by the data encoding unit respectively and convert the coded transmission data into transmission signals in different frequency bands.

11. The system according to claim 10, wherein a frequency band of the first transmitting unit is 2.4 GHz, and a frequency band of the second transmitting unit is 5 GHz.

12. The system according to claim 10, wherein a frequency band of signal transmission between the first receiving unit and the first transmitting unit is 2.4 GHz, and a frequency band of signal transmission between the second receiving unit and the second transmitting unit is 5 GHz.

13. The system according to claim 9, wherein the first and second transmitting units are 5 GHz WIFI units; wherein the first transmitting unit has a first frequency band, the second transmitting unit has a second frequency band that is different from the first frequency band.

14. The system according to claim 13, wherein the first frequency band is U-NII-1, and the second frequency band is U-NII-3.

15. The system according to claim 13, wherein the wireless transmitting unit further comprises a first band-pass filter coupled to an output of the first transmitting unit and a second band-pass filter coupled to an output of the second transmitting unit;
the first band-pass filter is configured to limit a frequency band of a transmission signal output by the first transmitting unit to the first frequency band; and
the second band-pass filter is configured to limit a frequency band of a transmission signal output by the second transmitting unit to the second frequency band.

16. The system according to claim 13, wherein the wireless receiving unit further comprises: a third band-pass filter coupled to an input of the first receiving unit and a fourth band-pass filter coupled to an input of the second receiving unit;
the third band-pass filter is configured to limit a frequency band of a transmission signal received by the first receiving unit to the first frequency band; and
the fourth band-pass filter is configured to limit a frequency band of a transmission signal received by the second receiving unit to the second frequency band.

17. The system according to claim 4, wherein the wireless transmitting unit comprises a first transmitting unit and a second transmitting unit, and the wireless receiving unit comprises a first receiving unit and a second receiving unit; the first transmitting unit and the first receiving unit form a communication link in a one-to-one correspondence manner, the second transmitting unit and the second receiving unit also form another communication link in a one-to-one correspondence manner; the first transmitting unit is configured to transmit data packets to the first receiving unit with a first frequency band, and the data decoding unit is configured to, when it verifies that a M-th data packet sent by the first transmitting unit is incorrect, send a command to the transmitter to request the second transmitting unit to transmit the M-th data packet.

18. The system according to claim 3, wherein the wireless transmitting unit is selected from a group consisting of WIFI module, Bluetooth, 3G module, 4G module, 5G module, Sub-G module, millimeter wave module and LTE module; correspondingly, the wireless receiving unit is also selected from a group consisting of WIFI module, Bluetooth, 3G module, 4G module, 5G module, Sub-G module, millimeter wave module and LTE module.

19. The system according to claim 4, wherein the external input signal includes audio data.

20. The system according to claim 4, wherein the data encoding unit is configured to convert the coded transmission data of the video data into a plurality of frames of image data, and then convert each frame of image data into N data packets, where N is a positive integer.

* * * * *